Jan. 2, 1934.   F. H. OWENS   1,942,066
MEANS AND METHOD FOR RECORDING AND REPRODUCING PHOTOGRAPHIC SOUND RECORDS
Original Filed May 6, 1929
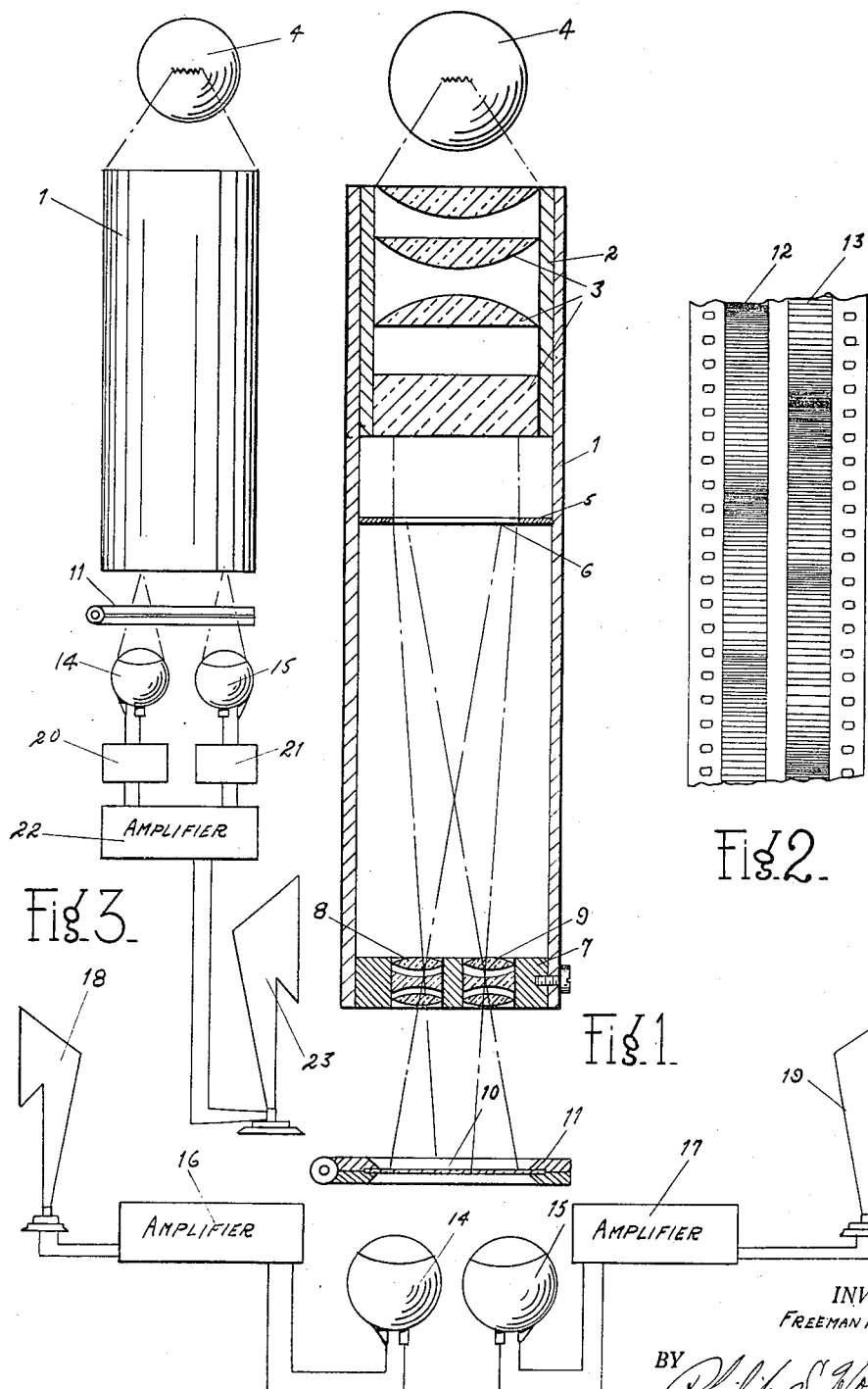
INVENTOR.
FREEMAN H. OWENS.

Patented Jan. 2, 1934

1,942,066

UNITED STATES PATENT OFFICE 1,942,066

MEANS AND METHOD FOR RECORDING AND REPRODUCING PHOTOGRAPHIC SOUND RECORDS

Freeman H. Owens, New York, N. Y.

Application May 6, 1929, Serial No. 360,874
Renewed May 23, 1933

3 Claims. (Cl. 179—100.3)

My invention relates to a means and method for recording or reproducing photographic sound records and has for its primary object the provision of optical means for dividing the aerial image of an illuminated slit into a plurality of aerial images thereof for recording or reproducing a plurality of photographic sound records.

In the art of recording and reproducing sound photographically, it may be desirable to have a plurality of records or sound tracks on the same strip of film for independent or simultaneous reproduction. For instance, one record may be music and another voice. This may be particularly useful in the so-called "talking pictures" wherein the reproduction of sound is synchronous with the exhibition of motion pictures.

Inasmuch as the frequencies of certain sounds, for instance music and voice, are different, I have found it desirable to make a separate sound record of each, one for music and one for voice and reproduce said records simultaneously but independent of each other, whereby full value of reproduction can be produced from each record without one blanketing or dominating the other.

Also it may be of real usefulness to have a plurality of identical sound records on a single film for simultaneous but independent reproduction whereby if one reproducing apparatus should fail, the other would continue the reproduction without interruption.

One object of my invention is to provide a single optical unit for use with a single source of light, for recording or reproducing a plurality of photographic sound records.

Furthermore, sound films may be provided on which original musical numbers are recorded on one sound track, and words or song added to the film on the other sound track in a language appropriate to the country in which the records are to be reproduced.

Other objects and advantages will be apparent as the description proceeds, reference now being had to the figures of the accompanying drawing, forming a part of this application and wherein like reference numerals indicate like parts.

In the drawing:—

Figure 1 is a sectional plan view, partially diagrammatic, of an embodiment of my invention.

Figure 2 is a detail view of a section of film bearing two photographic sound records such as may be recorded or reproduced by my invention.

Figure 3 is a plan view of my invention in a modified application thereof.

In carrying out my invention, I provide a tubular housing 1 in one end of which is secured a lens mount 2 carrying a condenser lens system 3 adapted to receive light from a single source such as the lamp 4 which may be a "recording" of "reproducing" lamp, depending upon the uses to which the invention is to be put.

Located within the tube 1 is a partition 5 provided with an elongated narrow slit 6 upon which the light from the lamp 4 is concentrated by the lens system 3.

Secured in the opposite end of the tube 1 is a lens mount 7 carrying a pair of laterally spaced focusing lenses 8 and 9 adapted to receive the light rays passing through said slit 6 and to focus said rays as reduced aerial images of said slit in spaced relation on a film 10 movable by any suitable means through a film guide or gate 11 in alignment with the tube 1, whereby to record upon the film the sound records 12 and 13 respectively (see Figure 2), or if the records are already on the film, to illuminate the same for reproduction. Photo electric cells 14 and 15 are positioned to receive the modulated light rays passing through the sound records 12 and 13 respectively. The outputs of the cells 14 and 15 are connected to amplifiers 16 and 17 and loud speaker devices 18 and 19 respectively, whereby the sound records are simultaneous but independently rendered audible.

If the sound record 12 is music for instance, and the record 13 is voice, and therefore of different frequencies, the loud speaker devices 18 and 19 may be different sizes or design, whereby to more accurately reproduce the sounds of the frequency range passing thereto.

A modified application of my invention is illustrated in Figure 3, wherein the photoelectric cells 14 and 15 have their outputs connected to filters 20 and 21 respectively, of any suitable design or construction and which are tuned to pass only frequencies of predetermined ranges. The filters are connected to a common amplifier 22, the output of which is carried to a loud speaker 23, whereby the composite reproduction of the two records 12 and 13 is rendered audible.

Thus it will be seen that I have provided a single optical unit, capable of use with a single source of light, whereby a plurality of photographic sound records may be recorded or reproduced simultaneously and independently, and involving the use of but a single slit, the aerial image of which is optically divided and focused as a plurality of slit images upon the film.

Of course, many changes may be made in details of construction and in the application of my invention without departing from the spirit and scope thereof. I do not limit myself therefore, to the form shown other than by the appended claims.

What is claimed is,

1. The method of reproducing simultaneously a plurality of photographic sound records comprising the steps of illuminating a narrow elongated slit, dividing the illuminated aerial image of said slit into a plurality of images laterally thereof, focusing such images on separate photographic sound records and simultaneously translating and rendering audible the modulated light rays passing through said records.

2. A recording and reproducing apparatus for photographic sound records comprising a housing, a condenser lens system therein, a slit member in said housing having a slit therein, and a plurality of laterally spaced focusing lenses in said housing in alignment with said slit and condenser lens, and a single source of light adjacent the end of the housing carrying said condenser lens.

3. A recording and reproducing apparatus for photographic sound records comprising a tubular housing, a condenser lens unit in one end of said housing and a plurality of laterally spaced photographic focusing lenses in the opposite end of said housing in longitudinal alignment with said condenser lens unit, a slit member in said housing between said unit and said focusing lenses, and a light source adjacent the end of said housing having the condenser lens unit.

FREEMAN H. OWENS.